United States Patent [19]

Paulson

[11] Patent Number: 5,277,665
[45] Date of Patent: Jan. 11, 1994

[54] REACTIVE TORQUE CONTROL

[76] Inventor: Peter O. Paulson, 320 Pumphill Gardens, Calgary, Alberta, T2V 4M7, Canada

[21] Appl. No.: 706,493

[22] Filed: May 28, 1991

[51] Int. Cl.⁵ .................................. F16H 7/14
[52] U.S. Cl. ............................ 474/114; 474/69
[58] Field of Search ............ 474/114, 70, 69, 23, 474/101, 109, 112, 113, 132, 26

[56] References Cited

U.S. PATENT DOCUMENTS

| | | | |
|---|---|---|---|
| 832,977 | 10/1906 | James | 474/114 |
| 1,616,191 | 2/1927 | Lipman | 474/114 |
| 2,471,773 | 5/1949 | Pollak | 474/114 |
| 2,791,126 | 5/1957 | Christopher | 474/114 X |
| 3,521,718 | 7/1970 | Masaoka et al. | 474/113 X |
| 4,130,172 | 12/1978 | Moody | 474/113 X |
| 4,648,854 | 3/1987 | Redington | 474/114 |
| 4,832,661 | 5/1989 | Wagner et al. | 474/69 |

FOREIGN PATENT DOCUMENTS

| | | | |
|---|---|---|---|
| 626035 | 8/1961 | Canada | 474/113 |
| 1213149 | 3/1960 | France | 474/114 |
| 376738 | 5/1964 | Switzerland | 474/23 |
| 535420 | 4/1941 | United Kingdom | 474/114 |
| 2093149 | 8/1982 | United Kingdom | 474/114 |
| 2172686 | 9/1986 | United Kingdom | 474/69 |

*Primary Examiner*—Rodney M. Lindsey
*Attorney, Agent, or Firm*—Arne I. Fors

[57] ABSTRACT

A power regulating apparatus for controlling power to a cyclic load in which a pivotally-mounted constant speed motor has a fixed diameter pulley on the motor output shaft operatively connected to a variable speed pulley mounted on a driven shaft whereby motor reactive torque due to an increase in load on the motor causes the motor and its fixed diameter pulley to approach the variable speed pulley allowing the effective diameter of the variable speed pulley to increase for reducing the rate of rotation of the variable speed pulley and increasing the torque of the driven shaft.

11 Claims, 4 Drawing Sheets

REACTIVE TORQUE CONTROL

FIELD OF THE INVENTION

This invention relates to a reactive torque control apparatus and, more particularly, relates to a reactive torque control apparatus which responds to changes in load for regulating the speed of an output or drive shaft.

BACKGROUND OF THE INVENTION

Oil well pumpjacks which are connected by a string of rods to a submerged reciprocating pump place a cyclic load on the motor or prime mover which drives the system. The power required to maintain a continuous operation in which the weight of the loaded system pump requires considerably more power during some parts of the cycle than other parts of the cycle and results in a wide fluctuation of power consumed. The resulting increasing energy consumed can be substantial and the wear on the drive motor excessive.

It is known to vary the power output from a constance speed electric motor by mounting a variable speed pulley on the motor output shaft. Pfleger U.S. Pat. No. 2,211,986 issued Aug. 20, 1940, for example, discloses a variable speed electric motor drive having a manually adjustable pulley for varying the effective pulley diameter. The drive motor is mounted on a pivotal base or on a spring-loaded slidable base to maintain the drive belt in a tightened condition.

Hallinan U.S. Pat. No. 2,369,044 issued Feb. 6, 1945 discloses a heating system having another embodiment of an automatic, belt-tightening assembly in which the change in placement of a pivotally mounted electric drive motor relative to a stationary blower controlled, for example, by a thermostatically-controlled bellows, is compensated by a spring-loaded variable-diameter pulley on the drive motor to maintain a constant belt tension. A desired blower speed can be obtained whereby the blower speeds up when the air temperature increases and slows down when the air temperature decreases.

Morton et. al. U.S. Pat. No. 2,479,764 issued Aug. 23, 1949, discloses a transmission governor for use with an electric motor wherein spring-loaded variable diameter pulleys are used in combination with governors to maintain a constant output speed with controlled belt tension.

Heyer U.S. Pat. No. 2,189,288 issued Feb. 6, 1940 discloses another embodiment of a variable speed transmission having one or more variable-diameter pulleys in which the drive motor is manually pivotable to maintain a desired belt tension.

None of the above patents discloses a power regulating apparatus for controlling the power required for a cyclic load wherein which the load demands transmitted to a constant speed motor are maintained substantially constant.

It is a principal object of the present invention, therefore, to provide a power regulating torque control apparatus for use in combination with a constant speed motor for equalizing power requirements of a cyclic load on the said motor.

It is another object of the present invention to provide a relatively simple and positively acting apparatus particularly suited for use with oil well pumpjacks.

SUMMARY OF THE INVENTION

The power regulating apparatus of the present invention for controlling power for a cyclic load comprises, in its broad aspect, a constant speed motor having an output shaft and a fixed diameter pulley mounted for rotation on said output shaft; a variable diameter pulley mounted for rotation on a driven shaft, said variable speed pulley being operatively connected by an endless belt to said fixed diameter pulley; means for mounting said motor for varying the distance between the output shaft and the driven shaft responsive to changes in load on the driven shaft whereby the said shafts approach each other during an increase in load, allowing the diameter of the variable diameter pulley to increase for reducing the rate of rotation of the driven shaft, and diverge from each other during a decrease in load allowing the diameter of the variable diameter pulley to decrease for increasing the rate of rotation of the driven shaft.

BRIEF DESCRIPTION OF THE DRAWINGS

The invention will now be described with reference to the accompanying drawings, in which.

DESCRIPTION OF THE PREFERRED EMBODIMENT

Figure 1A:
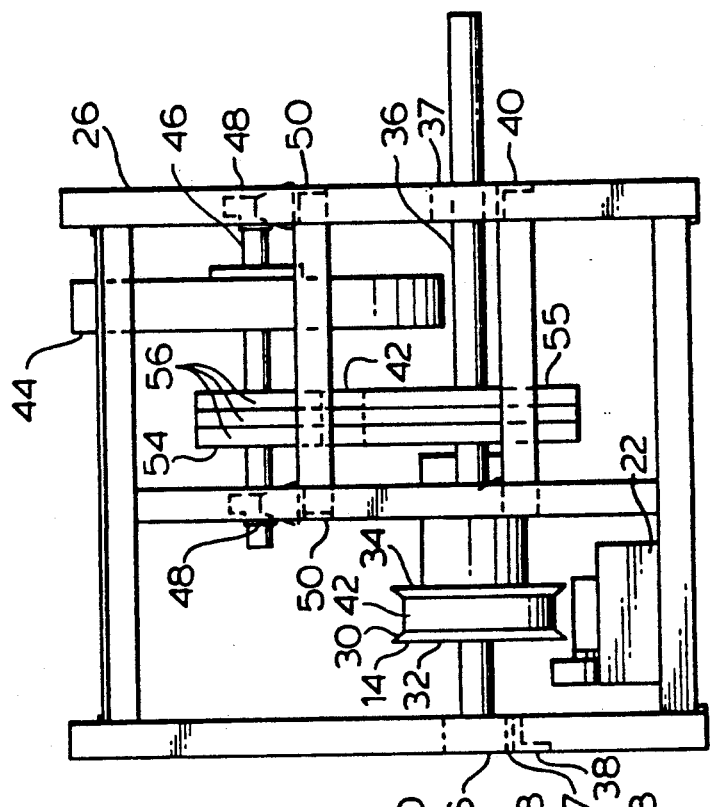
FIG. 1a is an end elevation of the apparatus shown in FIG. 1.
Figure 1:
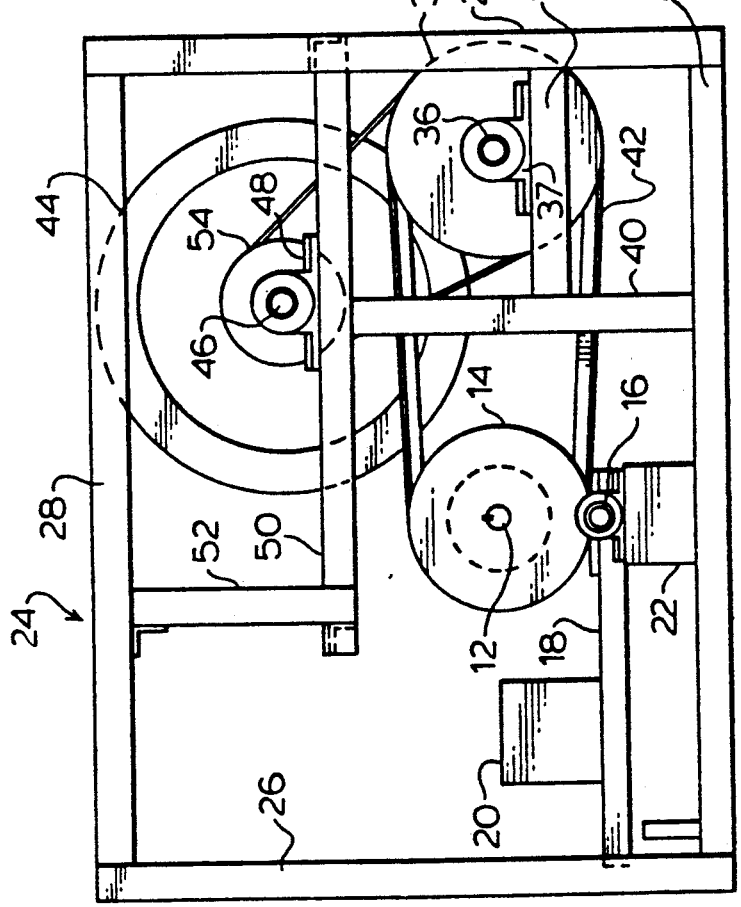
FIG. 1 is a side elevation of an embodiment of the apparatus of the present invention.

FIGS. 1 and 1a illustrate an embodiment of power regulating apparatus of the invention for controlling power for a cyclic load which comprises a prime mover or motor 10 having an output shaft 12 with fixed diameter pulley 14 keyed thereon for rotation with shaft 12. The motor is pivotally mounted on support 22 on one end of base 18 having a laterally adjustable weight 20 thereon in proximity to the opposite end.

Support 22 is secured to steel frame 2 which comprises vertical angle members 26 interconnected by horizontal angle members 28.

A variable-diameter pulley 30 is keyed onto shaft 36 and comprises opposed pulley halves 32, 34, which are spring loaded towards each other as is well-known in the art. Shaft 36 is journalled for rotation in bearings 37, 39, mounted on horizontal angle members 38, 40 respectively. Fixed diameter pulley 14 and variable-diameter pulley 30 are interconnected by V-belt 42. In the embodiment illustrated, flywheel 44 is keyed onto shaft 46 journalled for rotation in bearings 48 which are mounted on horizontal members 50 supported at one end by vertical angle members 52 and at the other end by members 26. Fixed diameter pulley 54 is keyed onto shaft 46 and interconnected with fixed diameter pulley 55 by v-belts 56. Output shaft 36 can be connected to a driven apparatus such as pumpjack, not shown.

In operation, the high torque requirement placed on the motor during start-up or during an increase in load placed on the drive system creates reactive torque in the motor causing it to pivot about pivot point 16 in a clockwise direction to shorten the distance between the motor and variable-diameter pulley 30 (commonly know as a variable-speed pulley). This results in a temporary decrease in the tension of belt 42 causing opposed halves 32, 34 of variable diameter pulley 30 to approach each other forcing belt 42 radially outwardly on pulley 30 to increase the effective diameter of the pulley. Since the motor is a constant speed motor, the peripheral velocity of pulley 14 and linear velocity of belt 42 does not change, resulting in the rate of rotation of pulley 30 slowing down as its effective diameter increases. The output torque of pulley 30 increases proportionately with the increase in diameter to increase the output torque of shaft 36 and to more effectively counter and match the increase in load imposed on the drive apparatus. The inertia of flywheel 44 tends to equalize torque requirements, its momentum assisting motor 10 during increase in load such as under cyclic load conditions when pulley 30 slows down.

Figure 2:
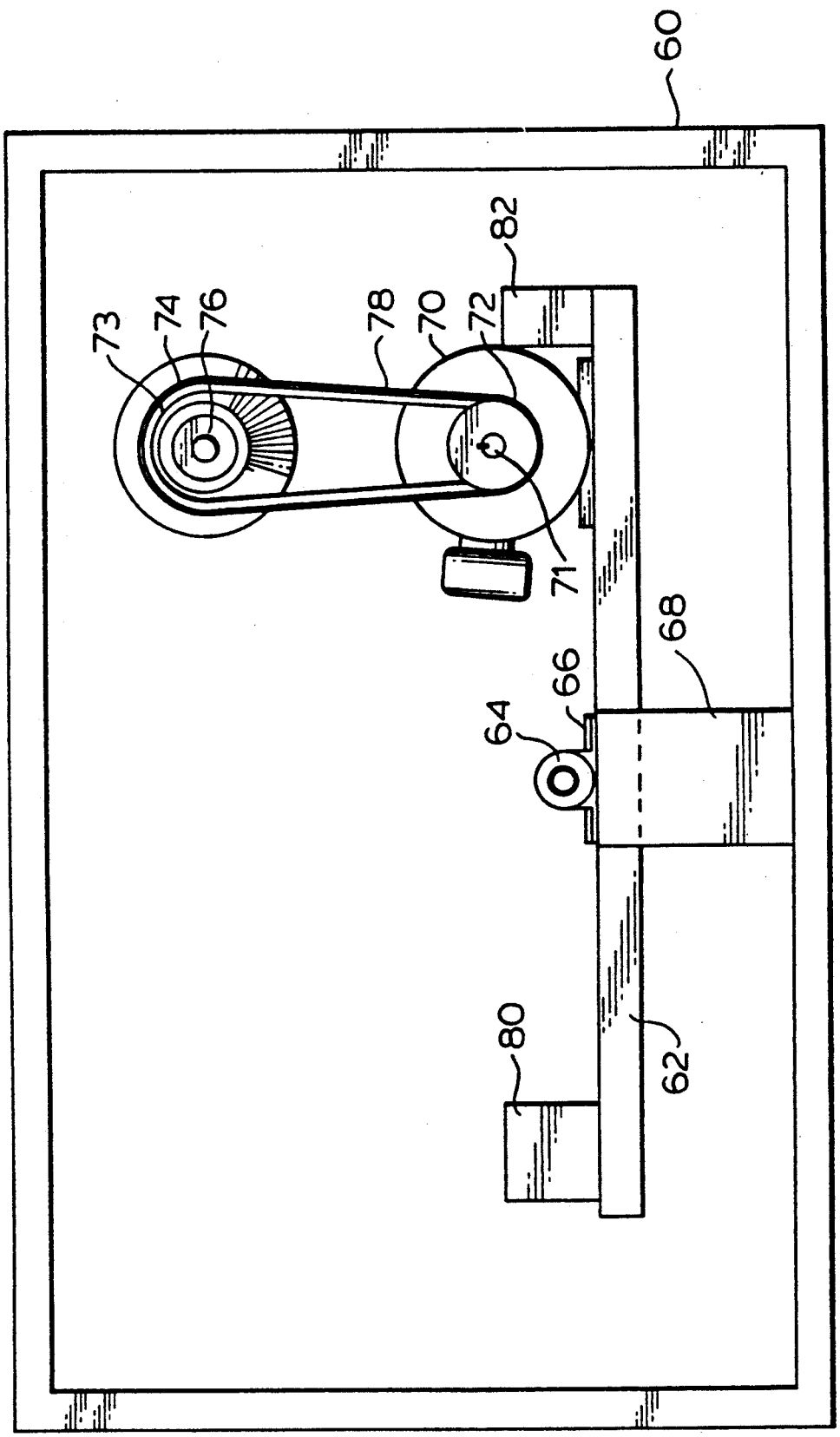
FIG. 2 is a side elevation of another embodiment of the apparatus of the invention.

FIG. 2 shows another embodiment of power regulating apparatus which comprises a metal frame 60 having a base 62 pivotally mounted at 64 in bearings 66 mounted on base 68. Motor 70 is mounted at one end of base 62 and contains a fixed-diameter pulley 72 keyed on motor output shaft 71. A variable-diameter pulley 73 mounted on driven shaft 76 is interconnected with pulley 72 by V-belt 78. Base 62 has weights 80 or 82, mountable at opposite ends thereof to increase or reduce the tension in belt 78 produced by the mass of the motor. Shaft 76 can be connected to a cyclic load such as a pumpjack by a further pulley-belt system, not shown, with or without a fly-wheel.

In operation, the imposition of a load on shaft 76 is communicated to motor 70 causing the reactive torque of motor 70 to pivot motor 70 upwardly in a counter-clockwise direction about pivot point 64 to shorten the center distance between the shaft of the motor and the output shaft. The opposed halves which comprise variable-diameter pulley 74 approach each other causing belt 78 to move radially outwardly on the pulley to reduce the rate of rotation of the said pulley with an increase in output torque of shaft 76.

Figure 3:
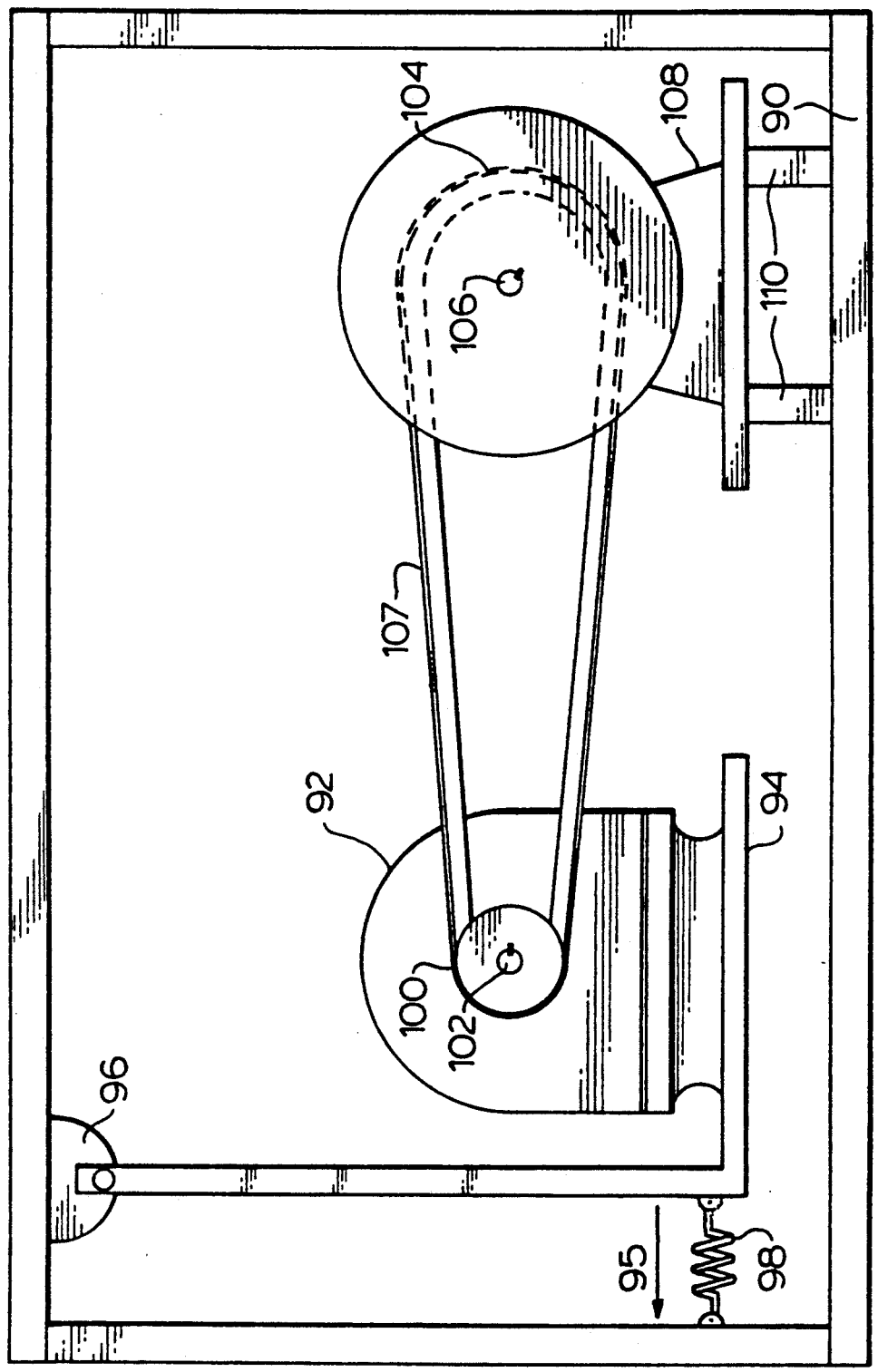
FIG. 3 is a further embodiment of the apparatus of the invention.

FIG. 3 discloses another embodiment of the power regulating apparatus of the invention which comprises a steel frame 90 having a motor 92 suspended therefrom on base 94 pivotally mounted at 96 to form a pendulum. A tension spring 98 biases platform 94 in the direction of arrow 95.

Fixed-diameter pulley 100 is keyed onto motor shaft 102 and is interconnected with variable-diameter pulley 104 keyed onto driven shaft 106 by drive belt 107. Driven shaft 106 is journalled on stand 108 supported by legs 110 and is operatively connected to a load.

An increase of load on shaft 106 causes an increase in torque of motor 92. The reactive torque of motor 92 deflects motor 92 in a counter-clockwise direction about pivot point 96 as viewed in FIG. 3 to bring motor 92 closer to pulley 104, whereby the tension of belt 107 is decreased to allow the belt to move radially outwardly on pulley 104 to effectively increase the diameter thereof. The output torque of pulley 104 and shaft 106 is increased proportionately.

Figure 4:
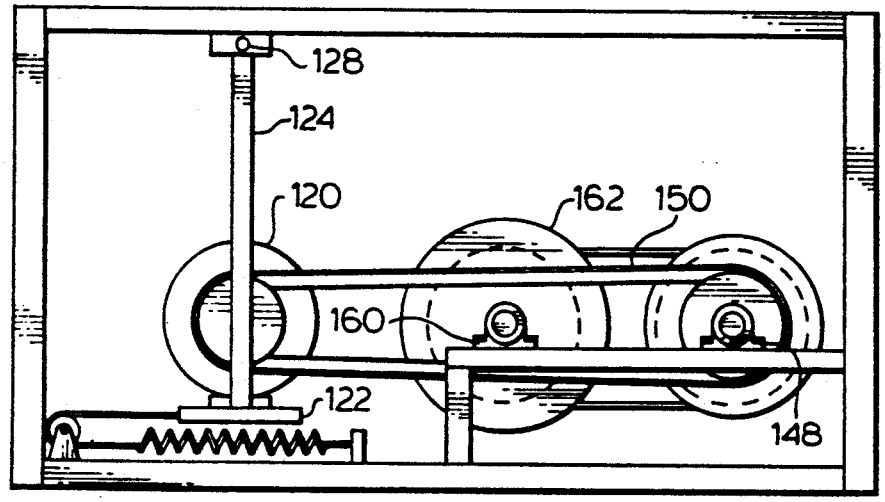
FIG. 4 is a side elevation of a further embodiment of the apparatus of the invention.
Figure 5:
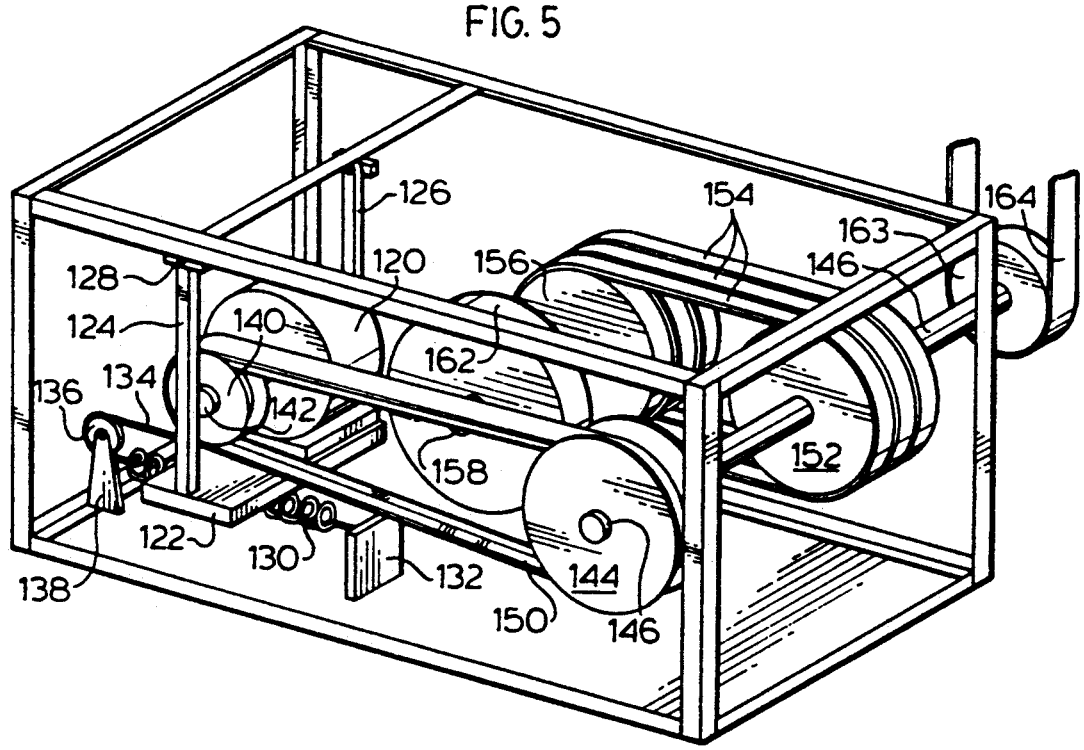
FIG. 5 is a perspective view of the embodiment shown in FIG. 4, partly cut away for clarity of description.

FIGS. 4 and 5 illustrate a power regulating apparatus in which electric motor 120 is mounted on base 122 pivotally supported by arms 124, 126 pivoted at 128 to form a pendulum. Motor 120 is biased to the left as viewed in the figures by tension spring 130 anchored at block 132 having cable 134 which passes over pulley 136 rotatably mounted on support 138. Fixed diameter pulley 140 is keyed onto motor shaft 142.

A variable diameter pulley 144 is keyed onto shaft 146 journalled in bearings 148 and is operatively connected to pulley 140 by V-belt 150. Shaft 146 supports fixed diameter pulley 152 having V-belts 154 connected to fixed diameter pulley 156 on shaft 158 journalled in bearings 160. Flywheel 162 is keyed onto shaft 158. Shaft 148 has a fixed diameter pulley 163 having belt 164 operatively connected to a load such as a pumpjack, not shown.

In operation, reactive torque in motor 120 at start-up or during load increase causes motor 120 to pivot to the right against the bias of spring 130 to shorten the distance between motor 120 and variable diameter pulley 144 allowing belt 150 to move outwardly on pulley 144 to increase the output torque of shaft 146.

The present invention provides a number of advantages.

The amperage requirements of a 20 horsepower standard constant speed 460-volt electric drive motor producing 300,000 ft. lbs. of torque for an oil well pumpjack lifting 2000 meters of sucker rods can vary, for example, from 35 amps during the pump upstroke to less than 5 amps during the pump downstroke. The apparatus of the invention, with the use of a flywheel, reduced the amplitude of amperage swing to the range of 6.5 to 8.5 amps, for a substantial saving in wired horsepower requirements, energy consumed and wear on the motor and drive system. The removal of the flywheel from the system broadened the range of amperage to 6.5 to 14 amps.

It will be understood that modifications can be made in the embodiment of the invention illustrated and described herein without departing from the scope and purview of the invention as defined by the appended claims.

I claim:

1. A power regulating apparatus for controlling power for a cyclic load comprising, in combination:
   a constant speed motor having an output shaft and a fixed diameter pulley mounted for rotation on said output shaft;
   a driven shaft spaced from said output shaft and a variable diameter pulley mounted for rotation on said driven shaft, said variable diameter pulley being operatively connected by an endless belt to said fixed diameter pulley;
   means for mounting said motor for varying the distance between the output shaft responsive to changes in load due to master reactive torque on the driven shaft whereby the said shafts can approach each other during an increase in load allowing the effective diameter of the variable diameter pulley to increase for reducing the rate of rotation of the driven shaft, and diverge from each other during a decrease in load allowing the effective diameter of the variable diameter pulley to decrease for increasing the rate of rotation of the driven shaft.

2. A power regulating apparatus as claimed in claim 1 in which said mounting means for the motor comprise a base on which the motor is mounted and means operatively connected to the base for biasing the fixed pulley on the motor output shaft away from the variable diameter pulley.

3. A power regulating apparatus as claimed in claim 2 in which the means operatively connected to the base for biasing the fixed pulley on the motor output shaft away from the variable diameter pulley comprises a pendulum supporting the base and a tension spring connected to the base.

4. A power regulating apparatus as claimed in claim 3 in which said driven shaft is operatively connected to a flywheel and for use with a pumpjack.

5. A power regulating apparatus as claimed in claim 2 in which the means operatively connected to the base for biasing the fixed pulley on the motor output shaft away from the variable diameter pulley comprises a counter-weight mounted on the base.

6. A power regulating apparatus as claimed in claim 2 in which the means operatively connected to the base for biasing the fixed pulley on the motor output shaft away from the variable diameter pulley comprises a pivot point located under the motor and a counter-weight for pivoting the motor away from the variable diameter pulley.

7. A power regulating apparatus as claimed in claim 2 in which said driven shaft is operatively connected to a flywheel.

8. A power regulating apparatus as claimed in claim 2 in which said driven shaft is operatively connected to a flywheel and to said cyclic load.

9. A power regulating apparatus as claimed in claim 2 in which said driven shaft is operatively connected to a flywheel and to for use with a pumpjack.

10. A power regulating apparatus as claimed in claim 3 in which said driven shaft is operatively connected to a flywheel.

11. A power regulating apparatus as claimed in claim 3 in which said driven shaft is operatively connected to a flywheel and to said cyclic load.

* * * * *